(12) United States Patent
Adams et al.

(10) Patent No.: US 8,541,959 B2
(45) Date of Patent: Sep. 24, 2013

(54) SYSTEM AND METHOD FOR PROVIDING A CONTROL SIGNAL

(75) Inventors: Robert Adams, West Bloomfield, MI (US); Uli Joos, Nonnenhorn (DE); Josef Schnell, Wasserburg (DE); Jochen Zwick, Markdorf (DE)

(73) Assignee: Continental Automotive GmbH, Hannover (DE)

( * ) Notice: Subject to any disclaimer, the term of this patent is extended or adjusted under 35 U.S.C. 154(b) by 233 days.

(21) Appl. No.: 13/054,595

(22) PCT Filed: Mar. 20, 2009

(86) PCT No.: PCT/EP2009/002074
§ 371 (c)(1),
(2), (4) Date: Feb. 22, 2011

(87) PCT Pub. No.: WO2010/012323
PCT Pub. Date: Feb. 4, 2010

(65) Prior Publication Data
US 2011/0140636 A1   Jun. 16, 2011

(30) Foreign Application Priority Data
Jul. 28, 2008  (EP) .................................... 08013516

(51) Int. Cl.
*H05B 41/36* (2006.01)
(52) U.S. Cl.
USPC ......... 315/308; 315/360; 315/291; 315/209 R (58) Field of Classification Search
USPC ............. 315/119, 127, 209 R, 226, 225, 297, 315/299, 306, 307, 308, 360, 362
See application file for complete search history.

(56) References Cited

U.S. PATENT DOCUMENTS

| | | | |
|---|---|---|---|
| 6,307,356 B1 * | 10/2001 | Dwelley | 323/282 |
| 2004/0042793 A1 | 3/2004 | Hachiya et al. | |
| 2005/0237688 A1 | 10/2005 | Wong et al. | |

FOREIGN PATENT DOCUMENTS

| | | |
|---|---|---|
| JP | 2000305636 A | 11/2000 |
| JP | 2004140907 A | 5/2004 |
| WO | 2004042793 A2 | 5/2004 |

* cited by examiner

*Primary Examiner* — Douglas W Owens
*Assistant Examiner* — Jianzi Chen
(74) *Attorney, Agent, or Firm* — Laurence A. Greenberg; Werner H. Stemer; Ralph E. Locher

(57) ABSTRACT

The system, which provides a control signal, includes an over-current control unit, a time clock that provides a periodic time signal, and a clock generator unit that includes a first input terminal, a second input terminal, and an output terminal. The first input terminal is coupled to the time clock and the output terminal is coupled to the over-current control unit. The first input terminal of the clock generator unit receives the periodic time signal and the second input terminal of the clock generator unit receives a modification signal. The clock generator unit generates a clock signal based on the periodic time signal and the modification signal. The output terminal of the clock generator unit provides the clock signal to the over-current control unit, and the over-current control unit provides a control signal based on the clock signal.

18 Claims, 6 Drawing Sheets

FIG 1
State of the art

FIG 2
State of the art

SYSTEM AND METHOD FOR PROVIDING A CONTROL SIGNAL

BACKGROUND OF THE INVENTION

Field of the Invention

The present invention relates to the field of providing a control signal, in particular a control signal for controlling a load, for example a bulb. In particular, the present invention relates to a system for providing a control signal. Further, the present invention relates to a method of providing a control signal. Moreover, the invention relates to a program element. Furthermore, the invention relates to a computer-readable medium.

Further, this invention discloses in particular a method for driving a bulb, in particular an incandescent bulb, by a semiconductor switch. Thereby, the drive strategy allows to control the energy provided to the bulb as well as the switch in order to minimize the stress inside the semiconductor switch in case of overload conditions.

Integrated smart power switches use different protection strategies to prevent the switch from destruction during overload conditions.

The most common strategy is to apply an over-temperature shutdown, which protects the switch in case of a high power dissipation especially at high ambient temperatures. The disadvantage of this solution is a possible high permanent junction temperature which degrades and finally destroys the semiconductor switch.

An improved protection strategy is to use a linear current limitation which limits the switch current to values which are not critical to the switch. The main drawback is this strategy introduces a high amount of power dissipation in the switch during the turn-on phase of a capacitive load or an incandescent bulb. Therefore, the switch must be deactivated by a supervising intelligence in case of overload, e.g. output short-circuit, to prevent it from destruction.

Other components use a multilevel over-current shutdown strategy dependant on the load type. Thereby, the switch is deactivated immediately in case of an overload condition in order to protect it from destruction. This strategy suffers from an uncertainty of the warm up time due to

- a pulse width modulated operation (PWM), e.g. during power control or theatre dimming or
- an initialisation phase of an intelligent load ballast which causes a delay time until switch on of the load.

In this case, either the time-window of the current has to be enlarged which is a risk for the switch in case of over load or the over-current shutdown threshold of the switch is triggered, because the load has not yet reached the operating temperature.

This is described in more detail along with the following FIGS. 1, 2, 6, 7 and 8.

Figure 1:
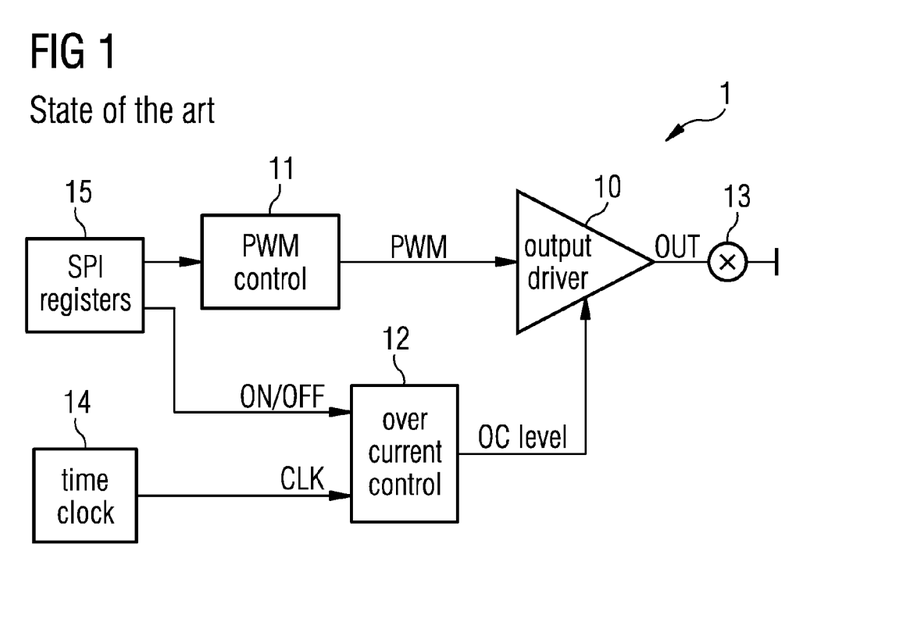
FIG. 1 shows a schematic diagram of a common circuit.

FIG. 1 shows schematically a common circuit 1 in order to generate a multilevel over-current shutdown strategy inside a smart power switch. The circuit 1 includes an output driver 10, a pulse width modulation—controller (PWM-controller) 11, an over-current control 12, a bulb or High Intensity Discharge (HID) ballast 13, a time clock 14 and a controller 15. The controller 15 determines which duty cycle the PWM-controller 11 is applying to a signal. The over-current control 12 is triggered by the controller command 15 and the time clock 14. With the ON/OFF command a timer is started inside the over-current control 12. This over-current control 12 counts the inrush phase and enables the proper threshold of the over-current shutdown to switch on an incandescent bulb.

Figure 2:
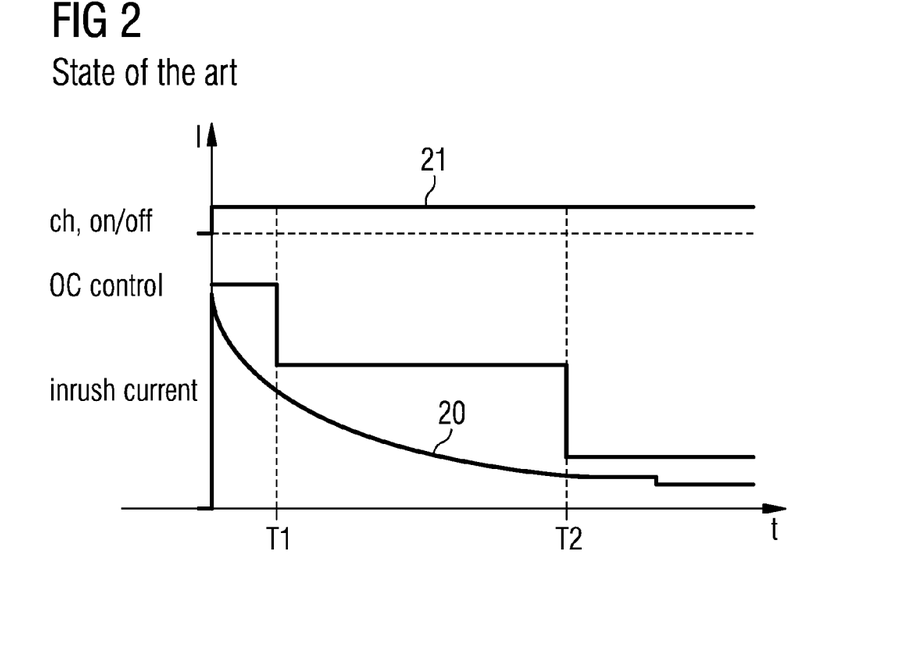
FIG. 2 shows a schematic diagram of an inrush current.

FIG. 2 shows schematically a diagram of the inrush current 20, which is plotted at the vertical axis, of an incandescent bulb driven with the example of a two-step over-current shutdown strategy with regard to the elapsing time t. The controller 15 triggers continuously an on-command 21 to the over-current control 12.

The over-current thresholds and time-windows are adjusted according to the maximum load condition in order to securely start the device under all operating conditions, e.g. voltage, ambient temperature and tolerances.

During high over-current threshold phases the switch can be potentially stressed in case of an over load condition e.g. short circuit which can not be distinguished from a bulb turn-on condition.

For new applications the switch has to be operated in PWM mode in order to limit the operating voltage and to provide a dimming or a soft start, e.g. for theatre dimming. But the PWM is limiting the root mean square voltage at the bulb and thereby enlarges the time until the bulb current drops below the DC over-current threshold.

To overcome this issue there are 2 common strategies in order to handle the PWM operation:

1. Use of a huge chip area in order to enable the switch to handle the high energy amount during a long time-window. The disadvantage is the high cost for a huge chip area.
2. The bulb is generally started with a constant on pulse until the bulb is warm enough to drop under the DC over current threshold. The drawbacks of this constant on pulse are, that the pulse time has to be controlled by the supervising intelligence which requires calculating time and also may cause a light flash when not set properly especially at low duty cycles.

Figure 6:
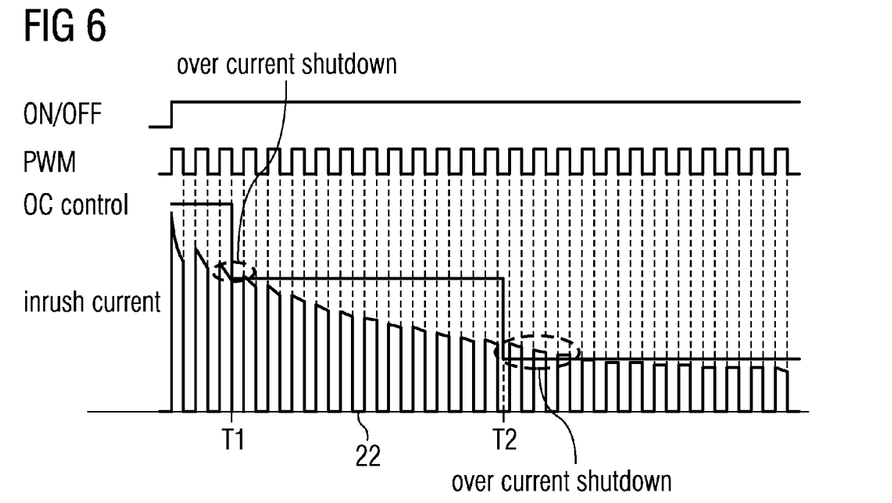
FIG. 6 shows schematically a diagram of the inrush current with a duty cycle less than 1.

FIG. 6 shows a schematic diagram of an inrush current 22 with a duty cycle less than 1. In this case, using a common circuit, would lead to an over current shutdown as the inrush current may be higher than an over current control cycle when a duty cycle of less than 1 is used. When the window time is too short, the inrush current would reach the over current control threshold and an over current shutdown would occur. Therefore, it may be necessary to adapt the window time of the over current control.

Figure 7:
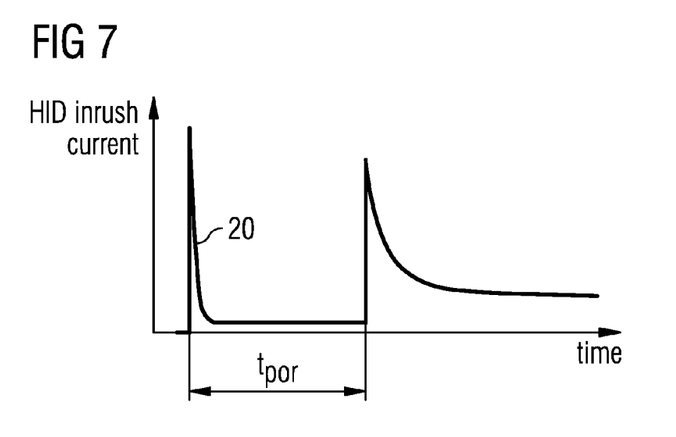
FIG. 7 shows a schematic diagram of the inrush current of a xenon load.
Figure 8:
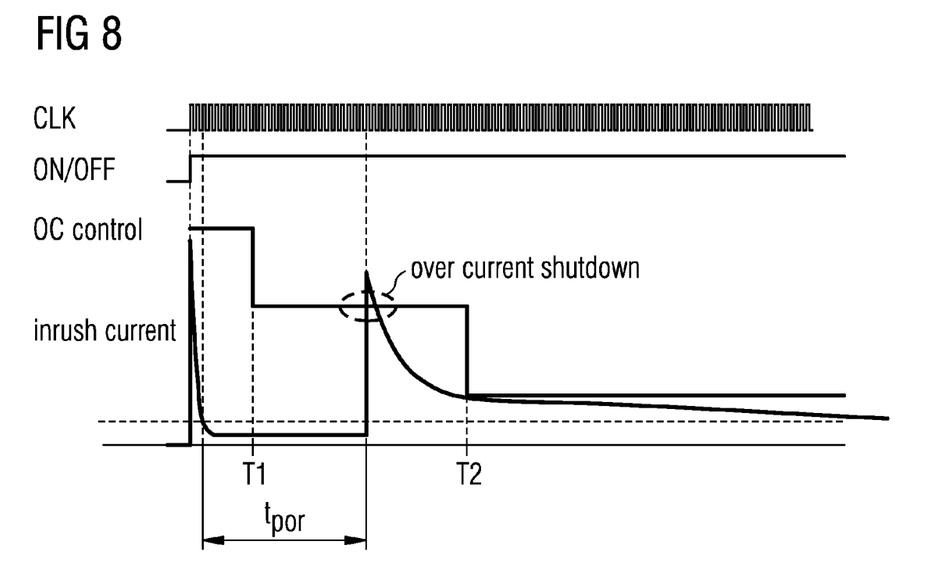
FIG. 8 shows a schematic diagram of the inrush current with shutdown.

FIG. 7 shows a schematic diagram of an inrush current 20 of a xenon load, which is plotted at the vertical axis with regard to the elapsing time t. The first peak in the current flow shows the charging current into the input capacitances of a component. A specific time period after turning on, the load is kept in a so called "power on reset" state. For obtaining a stable turning on behaviour, the load is supplied with power during this time whilst the normal mode, that means for example an illumination, is prevented internally. After the expiration of this time period, there is a further current pulse, illustrated by the second peak in FIG. 6, caused by the change to the normal mode. The time between the pulses or peaks is dependent on tolerances of the load and dependent on the respective producer.

The current thresholds and window times of the inrush current has to be dimensioned for a maximum "power on reset" time in order to start the load under all operating conditions, like voltage, ambient temperature, tolerances. If the window time is too short, the load current reaches the shutdown threshold leading to an immediate shutdown of the switch. This may be seen in FIG. 8. On the other hand, an extension of the window times would lead, in the case of an overload just under the shutdown threshold, to a high stress causing a failure of the component.

BRIEF SUMMARY OF THE INVENTION

A problem to be solved by the present invention is therefore, to provide a system and a method which may overcome the disadvantages of the state of the art.

This problem may be solved by a system and a method according to the independent claims. Preferred embodiments, which can be used alone or in combination with each other, are presented in the dependent claims.

According to a first aspect of the invention, a system is provided for providing a control signal for controlling a load, for example a bulb, wherein the system comprises an over-current control, a time clock, which is adapted to provide a periodical time signal, and a clock generator unit comprising a first input terminal and a second input terminal and an output terminal, wherein the first input terminal is coupled to the time clock and the output terminal is coupled to the over-current control, the clock generator unit being adapted to receive the periodical time signal at the first input terminal and to receive a modification signal at the second input terminal and wherein the clock generator unit is adapted to generate a clock signal on the basis of the periodical time signal and the modification signal and wherein the clock generator unit is further adapted to provide the clock signal to the over-current control at the output terminal, wherein the over-current control is adapted to provide a control signal on the basis of the clock signal.

The over current control may generate a control signal or over current control signal on the basis of the clock signal generated by the clock generator circuit. The time clock may be any kind of device or unit providing a periodical time signal.

With this system, the length of the inrush current windows may be adapted to the turning on profile of the used load, for example a bulb load. This is possible as the time counter is proceeding only when the load is turned on and thereby is warmed up.

According to a second aspect of the invention, a method of providing a control signal is provided, wherein the method comprises providing a periodical time signal by a time clock, receiving the periodical time signal at a first input terminal of a clock generator unit, receiving a modification signal at a second input terminal of the clock generator unit, generating a clock signal on the basis of the periodical time signal and the modification signal, providing the clock signal to an over-current control at the output terminal of the clock generator unit, providing a control signal on the basis of the clock signal by the over-current control.

According to a further aspect of the invention, a computer-readable medium (for instance a semiconductor memory, a CD, a DVD, a USB stick, a floppy disk or a harddisk) is provided, in which a computer program of providing a clock signal is stored, which computer program, when being executed by a processor, is adapted to carry out or control a method of providing a clock signal having the above mentioned features.

According to a further aspect of the invention, a program element (for instance a software routine, in source code or in executable code) of providing a clock signal is provided, which program element, when being executed by a processor, is adapted to carry out or control a method of providing a clock signal having the above mentioned features.

Providing a clock signal, which may be performed according to embodiments of the invention, can be realized by a computer program, that is by software, or by using one or more special electronic optimization circuits, that is in hardware, or in hybrid form, that is by means of software components and hardware components.

According to an exemplary embodiment, the control signal corresponds to a current-threshold value. The current-threshold value may be dependent on the maximum load conditions in order to securely start the device or load under all operating conditions.

According to a further exemplary embodiment, the system further comprises an output driver coupled to the over-current control for providing current pulses to a load on the basis of the control signal. A bulb for example may be generally started with a constant on pulse until the bulb is warm enough to drop under the DC over current threshold.

According to a further exemplary embodiment, the system further comprises a pulse width modulation controller coupled to an input terminal of the output driver and being adapted to provide signal-pulses with a certain, predetermined duty cycle to the output driver. The output driver may then generate an output signal based on these pulses supplied to the load.

According to a further exemplary embodiment, the output driver comprises a switch, the switch being adapted to provide the current pulses to the load in a first position, wherein the first position is set if a value of the current pulses resulting from the signal-pulses of the pulse width modulation controller is below a current-threshold value of the over-current controller.

According to a further exemplary embodiment, the load is a bulb, in particular an incandescent bulb.

According to a further exemplary embodiment, the clock generator unit comprises an AND-Gate having a first input and a second input where the first input is connected to the pulse width modulation controller and the second input is connected to the time clock; and an output being adapted to provide an outgoing signal combining the signals received by the first and the second input in order to synchronise the signals of the time clock with the signals of the pulse width modulation controller, so that it is ensured that the bulb is turned on and the switch is not destroyed in case of an overload. In this embodiment, the signal resulting from the pulse width modulation controller may be the modification signal.

According to a further exemplary embodiment, the second input terminal of the clock generator is coupled to an output terminal of the output driver, wherein the output driver is adapted to provide a feedback signal from the output driver to the clock generator unit. The feedback signal may generate an open load signal. This signal may indicate if a current flows or not. If an ignition of an automotive is activated, the open load signal may be switched off. The feedback signal may be the modification signal and may be used to generate the clock signal.

According to a further exemplary embodiment, the clock generator unit comprises a switch being responsive to the feedback signal. The switch may be affected when the feedback signal, for example the open load signal, changes. The feedback signal may change for example between two states.

According to a further exemplary embodiment, the clock generator unit is adapted to provide as clock signal in a first operating state the periodical time signal and in a second operating state a modified periodical time signal. This may denote that the periodical time signal is directly supplied to the over current control in the first operating state and indirectly via a modification unit in the second operating state.

According to a further exemplary embodiment, the modified periodical time signal is the periodical time signal divided by n. n may be any integer. With this embodiment, it may be possible that the clock frequency of the clock signal generated in the clock generator unit may be reduced. Therefore, the time period of the over current windows may be increased, since the same is deferred by a given number of clock cylces.

According to a further exemplary embodiment, the switch is adapted to switch the clock generator unit between the first and the second operating state. The switch may be a transistor, in particular a field-effect transistor. Switching between the both operating states may be carried out in response to the open load signal.

The invention provides further an apparatus procedure to adopt the inrush current of incandescent bulbs by using the fact that the bulb is only warmed up during on-time of the switch. Thereby the time counter which controls the inrush phase is gated with the on-signal of the switch.

In another aspect, the invention inhibits further an apparatus to control a bulb, in particular an incandescent bulb, by a smart switch including
- a bulb,
- an over-current control which provides a current-threshold value to an output driver,
- a pulse width modulation controller which provides signal-pulses with a certain duty cycle to the output driver,
- an output driver for providing current pulses to the bulb, the output driver comprising a switch having a first position in which the current-pulses are provided to the bulb, wherein the first position is set if the current pulses resulting from the signal-pulses of the pulse width modulation controller are below the current-threshold value of the over-current controller,
- a time clock which provides a periodical time signal with a certain length, whereas
- an AND-Gate having a first input and a second input where the first input is connected to the pulse width modulation controller and the second input is connected to the time clock; and an output providing an outgoing signal combining the signals received by the first and the second input in order to synchronise the signals of the time clock with the signals of the pulse width modulation controller, so that it is ensured that the bulb is turned on and the switch is not destroyed in case of an overload.

In another aspect the invention is about a method to use the apparatus of the previous paragraph, where the timers in the over-current control are incremented only during the on-phase of the PWM-values in order to match the over-current window to different PWM-signals.

This may enlarge the time of the switch on phase but may not increase the maximum energy in the switch because only the on phases represent a risk for the switch.

Due to the thermal inertia of the bulbs there may be only a low cooling effect inside the bulb during switch off phase.

As a consequence the switch may be designed with a low chip area as in a common design but also survives low duty cycle operation without risk or light flashes.

Further details and advantages of the invention are explained with regard to the enclosed figures.

DESCRIPTION OF THE INVENTION

With regard to the following description of the embodiments of the invention the same reference signs refer to the same or comparable components.

Figure 3:
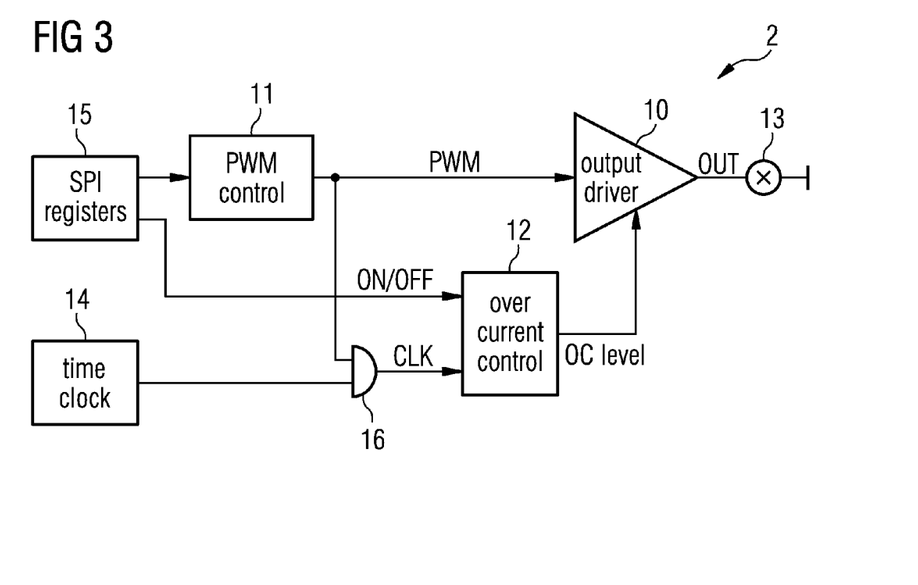
FIG. 3 shows a circuit 2 in order to generate a multilevel over-current shutdown.

FIG. 3 shows a first embodiment according to the application comprising a circuit 2 in order to generate a multilevel over-current shutdown strategy inside a smart power switch. The circuit 2 includes an output driver 10, a pulse width modulation-controller (PWM-controller) 11, an over-current control 12, a bulb 13, a time clock 14 and a controller 15. The controller 15 determines which duty cycle the PWM-controller 11 is applying to a signal. The over-current control 12 is receiving the signal of an AND-Gate 16 which has two inputs, one input by the pulse width modulation controller the other by the time clock 14.

Additionally, a controller 15 is sending its signals to the over-current control 12. With the ON/OFF command a timer is started inside the over-current control 12. This over-current control 12 counts the inrush phase and enables the proper threshold of the over-current shutdown to switch on an incandescent bulb. This enlarges the time of the switch on phase but does not increase the maximum energy in the switch because only the on phases represent a risk for the switch. The circuit 2 further includes a logical AND-Gate 16 in order to synchronise the PWM-controller 11 and the time clock 14 before entering the signal into the over-current control 12.

Due to the thermal inertia of the bulbs there is only a low cooling effect inside the bulb during switch off phase. Therefore, the inrush time can be enlarged inverse proportional to the duty cycle with a very good approximation:

$$T = \frac{T(100\%)}{d.c.}$$

Figure 4:
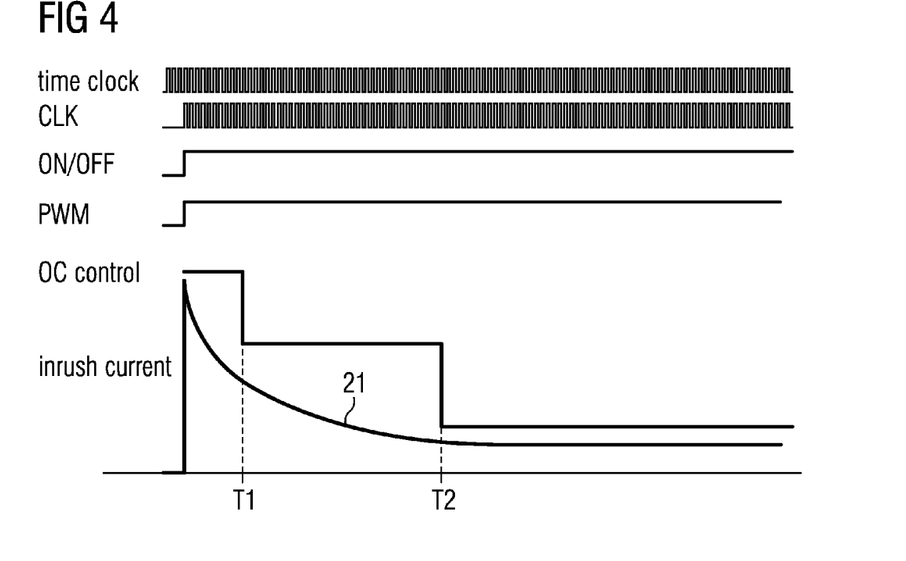
FIG. 4 shows schematically a diagram of the inrush current 22 with a duty cycle of 1.

FIG. 4 shows schematically a diagram of the inrush current 22, which is plotted at the vertical axis, of an incandescent bulb with regard to the elapsing time t. The difference to FIG. 2 gets visible, when a PWM operation is applied. Thereby, the over current windows are only proceeding, when the switch is in on phase.

Figure 5:
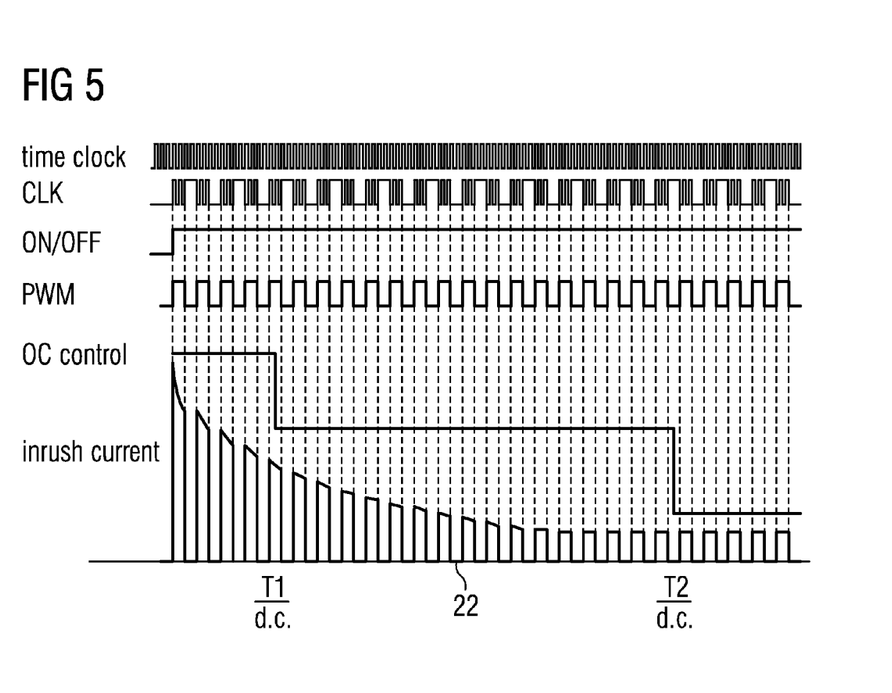
FIG. 5 shows schematically a diagram of the inrush current 22 with a duty cycle not 1.

FIG. 5 shows schematically a diagram of the inrush current 22, which is plotted at the vertical axis, of an incandescent bulb with regard to the elapsing time t. The difference to FIG.

2 gets visible, when a PWM operation is applied. Thereby the windows are only proceeding, when the switch is in on phase.

The area W under the over-current windows which refer to the max. energy in case of over load is constant independent on the PWM duty cycle.

$$W = I^2 \cdot R_{DSON} \cdot T_1$$

I=over current threshold
$R_{DSON}$=On resistance of the switch
d.c.=duty cycle

As a consequence the switch can be designed with a low chip area as in a common design but also survives low duty cycle operation without any risk in case of over load or light flashes in case of low duty cycles.

The present invention may be of particular use for the control of bulbs in vehicles.

Figure 9:
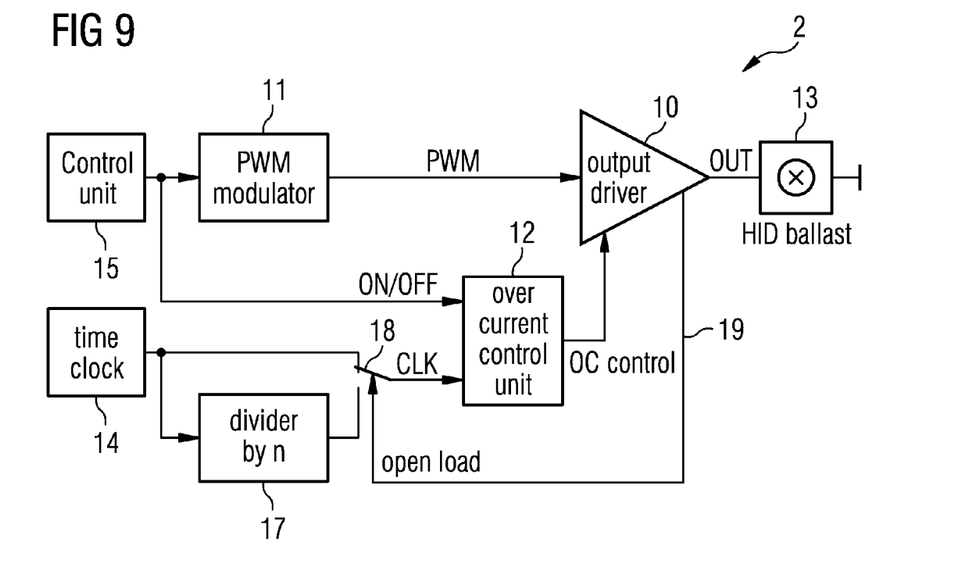
FIG. 9 shows a schematic block diagram of a system according to an embodiment of the application.

FIG. 9 shows a second embodiment of the system according to the application. The system 2 comprises a control unit or SPI register 15 coupled to a pulse width modulation (PWM) modulator 11. The PWM modulator 11 supplies a signal to an output driver 10. An output terminal of the output driver 10 is coupled to an HID ballast. The control unit 15 supplies an on/off-signal to an over current control unit 12, when the load is turned on. The over current control then provides a control signal to the output driver 10. The load is therefore controlled by the output driver in correspondence to the control signal provided by the over current control unit 12.

The over current control generates an over current control signal on the basis of a clock signal. This clock signal is provided by a clock generator unit. The clock generator unit comprises two input terminals and an output terminal. The output terminal is coupled to the over current control unit 12 for providing a clock signal. The clock generator unit is coupled with a first input terminal to a time clock 14. The time clock provides a periodical time signal. In a first operating state, the clock signal generated by the clock generator unit is equal to the periodical time signal.

The clock generator unit comprises further a switch 18. The switch 18 is responsive to a modification or open load signal 19 provided by a feedback signal from the output driver 10. If the modification signal is on, the clock generator unit is switched by the switch 18 to a second operating state. In this second operating state, the periodical time signal is divided by n (block 17) before being supplied to the over current control 12. n may be any specified value, in particular an integer number.

With this system, the length of the inrush current windows may be adapted to the turning on profile of the used xenon load. This is possible as the load only needs a small current in its power on reset mode.

The control unit 15 controls the load over the PWM modulator 11 and the output driver 10. When the load 13 is turned on, the over current control unit 12 receives the on-signal from the control unit 15 and then starts a counter with the received clock signal. At given counter readings, the shutdown threshold is set to a next value or step. The output driver 10 measures the output current and deactivates the output, if the shutdown threshold given by the over current control unit 12 is exceeded. During the power on reset mode of the load, the output driver 10 recognizes that there exist only a small load current and generates a signal "open load". This signal is sent as feedback signal to the clock generator unit. If the current is lower than the open load threshold, the clock of the counter is divided by n for the shutdown threshold and the expiration of the windows of the current thresholds is therefore decreased.

The system 2 supports the method of controlling a xenon lamp with intelligent semiconductor switch with a multilevel over current shutdown. The time periods of the over current shutdown windows may be increased in the case of a delayed starting of the load. The increasing of the time periods may be carried out by a reduction of the clock frequency of the respective counter. The increasing of the time periods may be further carried out by an interruption of the clock frequency of the respective counter. The reduction of the clock frequency may be carried out by a frequency divider. A discrete control signal may control the delayed starting of the load. Deceeding a current threshold may be detected as a delayed starting of the load. The increasing of the time periods of the over current shutdown windows may be carried out for only a part of the windows. The increasing of the time periods may be switched off and on in the semiconductor switch.

Figure 10:
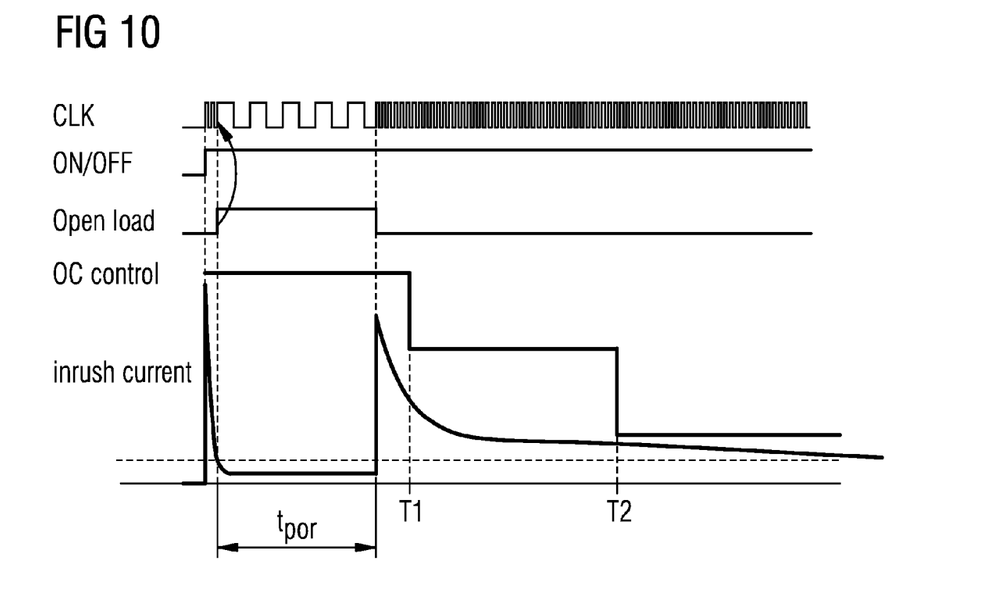
FIG. 10 shows a schematic inrush current and a modified inrush window according to an embodiment of the application.

FIG. 10 shows a schematic diagram of an inrush current and a modified inrush window according to an embodiment of the application. Caused by the open load signal, the frequency of the clock signal is reduced and the first inrush current window is therefore extended. Thus, the over current shutdown will not be activated at the second pulse of the load current.

Figure 11:
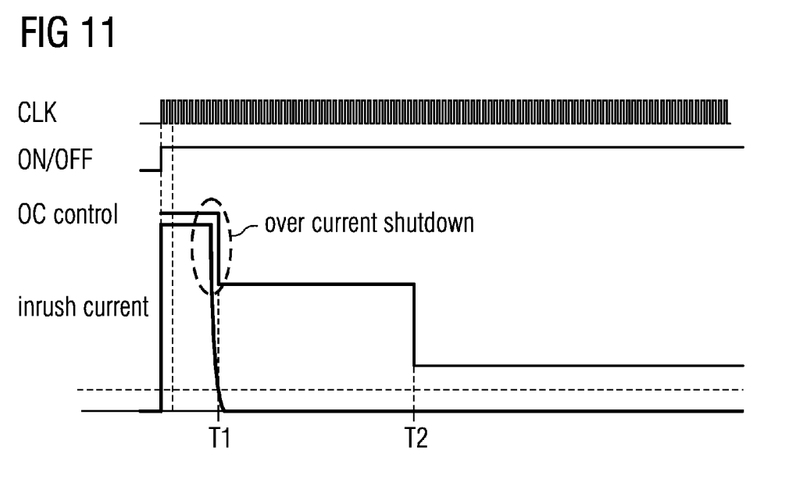
FIG. 11 shows a schematic inrush current with a over current shutdown according to an embodiment of the application.

In the case of an overload, the power loss and the stress of the component will not be increased. This may be seen in FIG. 11. Switching the counter for the over current shutdown to a slower clock frequency may be prohibited for specific levels, for example high current thresholds, which are not necessary for controlling a xenon load. Thus, the stress influencing the component in a failure situation may be further reduced.

Further, it would also be possible to stop the clock for the counter completely during the open load time period.

Figure 12:
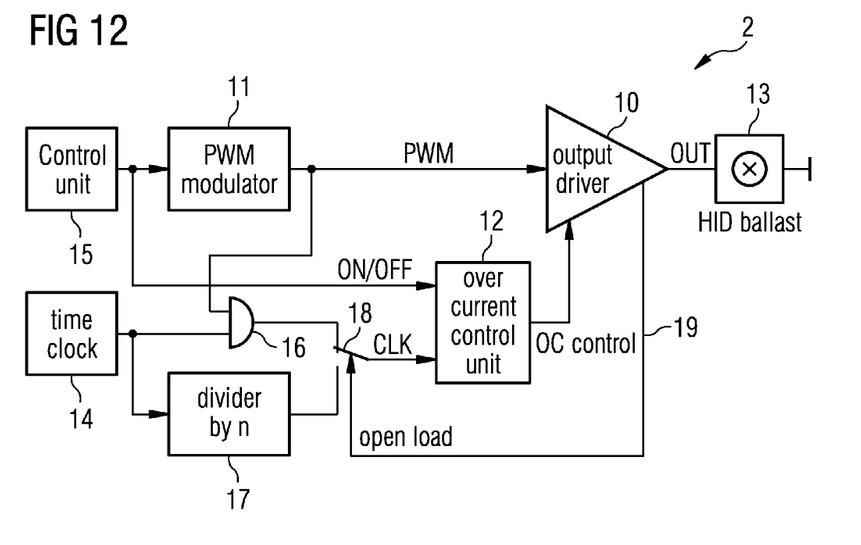
FIG. 12 shows a block diagram of a system according to an embodiment of the invention.

FIG. 12 shows a system combining the systems of FIGS. 3 and 9. The system comprises the components of the system according to FIG. 9. The system 2 further comprises an AND gate 16 in the direct path from the time clock 14 to the over current control unit 12. A first input terminal of the AND gate 16 is coupled to the output of the PWM modulator 11. A second input terminal of the AND gate 16 is coupled to the output of the time clock. The output terminal of the AND gate 16 is coupled to the input terminal of the over current control unit 12.

When the clock generator unit is in the first operating state, that means that the periodical time signal is not divided by n, the clock signal generated by the clock generator unit corresponds to the clock signal generated in the system of FIG. 3.

This system may therefore provide the advantages of the systems of FIGS. 3 and 9 in combination.

It should be noted that the term "comprising" does not exclude other elements or features and the "a" or "an" does not exclude a plurality. Also elements described in association with different embodiments may be combined.

It should also be noted that reference signs in the claims shall not be construed as limiting the scope of the claims.

The invention claimed is:

1. A system for providing a control signal, the system comprising:
   an over-current control unit;
   a time clock providing a periodic time signal; and
   a clock generator unit including a first input terminal coupled to said time clock to receive the periodic time signal, a second input terminal receiving a modification signal, and an output terminal coupled to said over-current control unit;
   said clock generator unit generating a clock signal based on the periodic time signal and the modification signal;

said output terminal of said clock generator unit providing the clock signal to said over-current control unit; and said over-current control unit providing a control signal based on the clock signal.

2. The system according to claim 1, wherein the control signal corresponds to a current-threshold value dependent on a maximum load condition.

3. The system according to claim 1, comprising:

an output driver coupled to said over-current control unit, said output driver providing current pulses to a load based on the control signal.

4. The system according to claim 3, comprising:

a pulse width modulation controller;

said output driver including an input terminal coupled to said pulse width modulation controller;

said pulse width modulation controller providing signal-pulses with a predetermined duty cycle to said output driver.

5. The system according to claim 4, wherein:

said output driver includes a switch having a first position in which the current pulses are provided to the load; and said switch is set to said first position if a value of current pulses resulting from the signal pulses of said pulse width modulation controller is below a current-threshold value of said over-current control unit.

6. The system according to claim 3, wherein the load is a bulb.

7. The system according to claim 4, wherein:

the load is a bulb;

said clock generator unit includes an AND-Gate with a first input that is connected to said pulse width modulation controller and a second input that is connected to said time clock; and said clock generator unit includes an output providing an output signal that combines the signal-pulses of said pulse width modulation controller that are received by said first input of said AND-Gate and the periodic time signal of said time clock that is received by said second input of said AND-Gate in order to synchronize the periodic time signal of said time clock with the signal-pulses of said pulse width modulation controller to ensure that the bulb is turned on and said switch is not destroyed in case of an overload.

8. The system according to claim 3, wherein:

said output driver includes an output terminal that is coupled to said second input terminal of said clock generator unit; and said output driver provides a feedback signal to said clock generator unit.

9. The system according to claim 8, wherein: said clock generator unit includes a switch responsive to the feedback signal.

10. The system according to claim 8, wherein:

said clock generator unit has a first operating state in which said clock generator unit provides the periodic time signal as the clock signal; and said clock generator unit has a second operating state in which said clock generator unit provides a modified periodic time signal as the clock signal.

11. The system according to claim 10, wherein the modified periodic time signal is the periodic time signal divided by n, and n is an integer greater than 1.

12. The system according to claim 10, wherein: said switch switches said clock generator unit between the first operating state and the second operating state.

13. The system according to claim 3, wherein the load is an incandescent bulb.

14. The system according to claim 1, wherein said clock generator unit has an operating mode in which the clock signal generated by said clock generator unit is the periodic time signal provided by said time clock.

15. A method for providing a control signal, the method which comprises:

providing a periodic time signal from a time clock;

receiving the periodic time signal at a first input terminal of a clock generator unit, and receiving a modification signal at a second input terminal of the clock generator unit;

generating a clock signal based on the periodic time signal and the modification signal;

providing the clock signal from an output terminal of the clock generator unit to an over-current control unit; and providing a control signal from the over-current control unit based on the clock signal.

16. The method according to claim 15, wherein the control signal provided by the over-current control unit corresponds to a current-threshold value dependent on a maximum load condition.

17. The method according to claim 15, which comprises providing an operating mode in which the clock signal from the output terminal of the clock generator unit is the periodic time signal provided by the time clock.

18. A non-transitory computer-readable medium comprising: a computer program stored on the non-transitory computer-readable medium, the computer program, when executed by a processor, carrying out or controlling a method including:

providing a periodic time signal from a time clock;

receiving the periodic time signal at a first input terminal of a clock generator unit, and receiving a modification signal at a second input terminal of the clock generator unit;

generating a clock signal based on the periodic time signal and the modification signal;

providing the clock signal from an output terminal of the clock generator unit to an over-current control unit; and providing a control signal from the over-current control unit based on the clock signal.

* * * * *